US008943474B1

(12) United States Patent
Basumallik et al.

(10) Patent No.: US 8,943,474 B1
(45) Date of Patent: Jan. 27, 2015

(54) CODE GENERATION AND EXECUTION FOR DYNAMIC PROGRAMMING LANGUAGES

(71) Applicant: The MathWorks, Inc., Natick, MA (US)

(72) Inventors: Ayon Basumallik, Framingham, MA (US); Brett W. Baker, Framingham, MA (US); Nikolay Mateev, Acton, MA (US); Hongjun Zheng, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 111 days.

(21) Appl. No.: 13/658,996

(22) Filed: Oct. 24, 2012

Related U.S. Application Data

(60) Provisional application No. 61/551,787, filed on Oct. 26, 2011.

(51) Int. Cl.
 *G06F 9/44* (2006.01)
 *G06F 9/45* (2006.01)
(52) U.S. Cl.
 CPC ........................................ *G06F 8/30* (2013.01)
 USPC ............................ 717/114; 717/106; 717/146
(58) Field of Classification Search
 CPC ............... G06F 8/20; G06F 8/30; G06F 8/31; G06F 9/45508; G06F 9/45516
 See application file for complete search history.

(56) References Cited

U.S. PATENT DOCUMENTS

| 7,574,700 | B2* | 8/2009 | Bracha .......................... 717/141 |
| 7,725,883 | B1* | 5/2010 | Nylander et al. ............. 717/139 |
| 7,802,268 | B2* | 9/2010 | Webb et al. .................... 719/331 |
| 7,809,545 | B2* | 10/2010 | Ciolfi et al. ...................... 703/22 |
| 8,046,751 | B1* | 10/2011 | Avadhanula et al. ......... 717/146 |
| 8,365,088 | B1* | 1/2013 | Rodriguez et al. ............ 717/136 |
| 8,473,901 | B1* | 6/2013 | Johnson ........................ 717/106 |
| 8,538,899 | B1* | 9/2013 | Orqueda et al. ................ 706/13 |
| 8,539,463 | B2* | 9/2013 | De et al. ........................ 717/146 |
| 8,627,281 | B2* | 1/2014 | Tatsubori ...................... 717/114 |

(Continued)

OTHER PUBLICATIONS

Igor Böhm, "Automatic Code Generation Using Dynamic Programming Techniques", Oct. 2007, Johannes Kepler University of Linz, Austria, pp. 1-97; <http://www.bytelabs.org/pub/papers/hburg07.pdf>.*

(Continued)

*Primary Examiner* — Thuy Dao
*Assistant Examiner* — Ben C Wang
(74) *Attorney, Agent, or Firm* — Harrity & Harrity, LLP

(57) ABSTRACT

A device receives programming code, corresponding to a dynamic programming language, that is to be executed by a computing environment, and executes the programming code. When executing the programming code, the device maintains a program counter that identifies an execution location within the programming code, and select blocks of the programming code based on the program counter. The blocks correspond to segments of the programming code, and are associated with type-based constraints that relate to types of variables that are used by the block. When executing the programming code, the device also compiles the selected blocks, caches the compiled blocks along with the type-based constraints, generates linking information between certain ones of the compiled blocks based on the type-based constraints, and executes the compiled blocks in an order based on the program counter, the type-based constraints, and the linking information.

21 Claims, 10 Drawing Sheets

(56) References Cited

U.S. PATENT DOCUMENTS

| | | | | |
|---|---|---|---|---|
| 8,627,282 B1* | 1/2014 | Karr | | 717/114 |
| 8,769,486 B2* | 7/2014 | Webb | | 717/106 |
| 8,813,027 B2* | 8/2014 | Ng et al. | | 717/106 |
| 8,826,229 B2* | 9/2014 | Foti | | 717/106 |
| 2003/0097648 A1* | 5/2003 | Allison | | 717/114 |
| 2003/0154468 A1* | 8/2003 | Gordon et al. | | 717/146 |
| 2006/0048095 A1* | 3/2006 | Meijer et al. | | 717/114 |
| 2006/0212882 A1* | 9/2006 | Foti et al. | | 719/330 |
| 2006/0277526 A1* | 12/2006 | Webb et al. | | 717/109 |
| 2007/0055978 A1* | 3/2007 | Meijer et al. | | 719/331 |
| 2007/0234288 A1* | 10/2007 | Lindsey et al. | | 717/117 |
| 2007/0288885 A1* | 12/2007 | Brunel et al. | | 717/104 |
| 2008/0052730 A1* | 2/2008 | Webb et al. | | 719/331 |
| 2008/0209394 A1* | 8/2008 | Andersen et al. | | 717/114 |
| 2008/0216061 A1* | 9/2008 | Allen | | 717/146 |
| 2009/0037158 A1* | 2/2009 | Shakeri et al. | | 703/2 |
| 2011/0131556 A1* | 6/2011 | Tatsubori | | 717/137 |
| 2011/0179402 A1* | 7/2011 | Buckley et al. | | 717/140 |
| 2011/0239188 A1* | 9/2011 | Lindsey et al. | | 717/117 |
| 2012/0180025 A1* | 7/2012 | Webb | | 717/114 |
| 2012/0216077 A1* | 8/2012 | Christensen et al. | | 714/38.1 |
| 2013/0031536 A1* | 1/2013 | De et al. | | 717/146 |
| 2013/0290987 A1* | 10/2013 | Meijer et al. | | 719/331 |
| 2014/0040860 A1* | 2/2014 | Darcy et al. | | 717/114 |

OTHER PUBLICATIONS

Zaeem et al., "Test Input Generation Using Dynamic Programming", 2012 ACM, SIGSOFT'12/FSE-20, Nov. 2012, Cary, North Carolina, USA, pp. 1-11; <http://dl.acm.org/results.cfm?h=1&cfid=417717926&cftoken=68174932>.*

Park et al., "Dynamic Code Overlay of SDF-Modeled Programs on Low-end Embedded Systems", IEEE, Date'06, Mar. 2006, pp. 1-2; <http://ieeexplore.ieee.org/stamp/stamp.jsp?tp=&arnumber=1657026>.*

* cited by examiner

CODE GENERATION AND EXECUTION FOR DYNAMIC PROGRAMMING LANGUAGES

RELATED APPLICATION

This application claims priority under 35 U.S.C. §119 based on U.S. Provisional Patent Application No. 61/551,787, filed Oct. 26, 2011, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

A dynamic programming language may broadly refer to a class of programming languages that may perform one or more operations at runtime that would normally be performed, in a static programming language, at compile time. These operations may include type-checking of variables, extending the behavior of program objects, and/or other operations.

Relative to static programming languages, dynamic programming languages can provide a more flexible computing environment that may tend to decrease developer programming time. A program implemented in dynamic programming languages, however, frequently executes slower than a program implemented in a static programming language. Accordingly, it is desirable for a computing environment, that executes programs implemented using a dynamic programming language, to efficiently execute the programs.

Overview

Systems and/or methods, described herein, may generate and execute code for dynamic programming languages. For example, the systems and/or methods may generate code for program code provided by the dynamic programming languages. The program code may be generated a block at a time. A block may correspond to a program segment that has one entry and one or more exits. Types of values within a block may be deterministic or inferable with analysis. A block may be created for a set of types, and multiple clones may be generated for a block. The clones may differ only in the types of values that the clones handle. The systems and/or methods may efficiently select and link these clones for execution.

Figure 1:
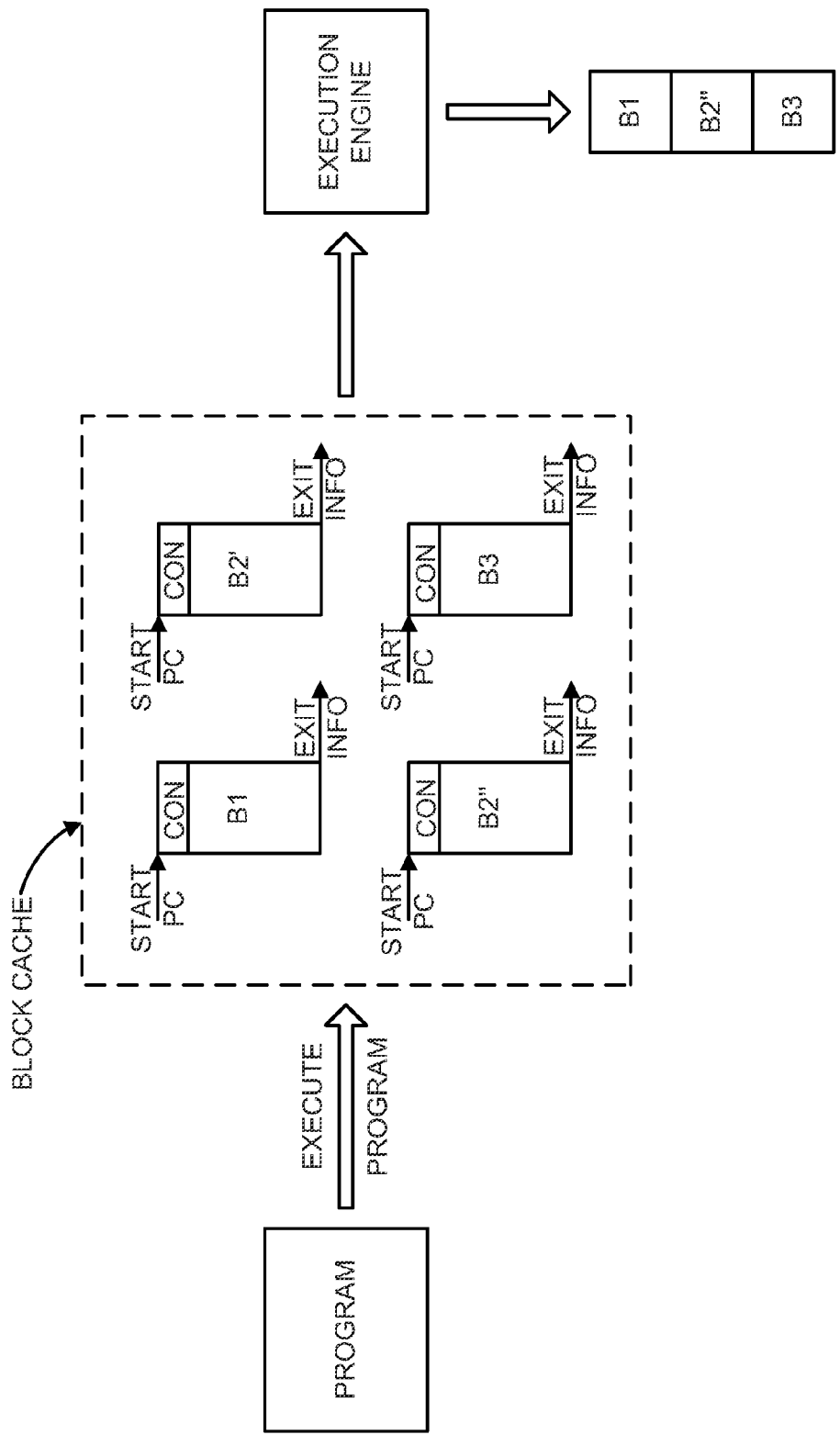
FIG. 1 is a diagram of an overview of an example implementation described herein.

FIG. 1 is a diagram of an overview of an example implementation described herein. As shown in FIG. 1, a computing environment, such as a technical computing environment (TCE), may include a program, a block cache, and an execution engine. The program may include programming code created using a dynamic programming language, such as the MATLAB® programming language, Python, Ruby, JavaScript, etc. The block cache may include a data structure, stored in a memory, that stores blocks (or compiled segments) of the program. The execution engine may execute the program by executing the blocks stored in the block cache.

A programmer may create the program using a dynamic programming language, and, at some point, may wish to execute the program. The programmer may initiate execution of the program through a computing environment, such as a TCE or another computing environment. In one example implementation, the program may be executed by segmenting the program into blocks, where each block may represent a segment of the program that has one entry and one or more exits. Blocks may be selected so that, within a block, the types of variables within the block are deterministically known or can be inferred. Each of the blocks of the program may be compiled. In some implementations, not all of the blocks of the program may be immediately compiled. For example, blocks may be compiled as needed for execution of the program. In some implementations, the compiled blocks may be cached so that blocks may be reused without having to be re-compiled.

As further shown in FIG. 1, the blocks may be stored in the block cache. In one example, the block cache may store four blocks labeled as blocks B1, B2', B2", and B3. Each block may be associated with constraints (CON), beginning program counter (START PC) values, and information about block exits (EXIT INFO). The constraints for a block may represent conditions that should be satisfied before a block can be selected for execution. The conditions may be based on variables, and corresponding variable types, that are read within a particular block. The beginning PC values may represent a location, within the program, at which the block begins. The exit information may describe variables and corresponding variable types that are written within a particular block. The exit information may also include a program counter for the next block to be executed.

Multiple blocks may represent the same segment of code in the program. For example, a particular segment of code in the program may read a variable "X." Because the program is expressed in a dynamic programming language, the type of variable "X" may not be determinable before execution of the program. For instance, at one point during the execution of the particular segment of the program, variable "X" may be an integer. At another point during the execution of the particular segment of the program, variable "X" may be a real number (e.g., double type). Accordingly, the block cache may include multiple compilations of the particular segment of the code, where the different compilations may make different assumptions about the type of variable "X." The correct compiled block to use may be determined during execution of the program. In FIG. 1, blocks B2' and B2" are shown, which may represent different compilations of the same segment of the program.

During a run-time operation, the execution engine may execute the compiled blocks provided in the block cache. At the end of a block, the next PC value in the exit information may be used to obtain a set of blocks that are next candidates to be executed. The constraints for each block, in the set of blocks, may be used to determine which block to execute. If no blocks are determined to be executable from the set, a new block may be compiled. In the example of FIG. 1, the execution engine is shown as having selected blocks B1, B2", and B3 as the series of blocks to execute.

In some implementations, to optimize the operation of the execution engine, blocks may be linked to create a series of linked blocks. A link between two blocks may indicate that a block, associated with an inbound link, may always follow another block associated with a corresponding outbound link. In this situation, execution of the program may be made more efficient as the execution engine may not need to check the block constraints before executing the block associated with the inbound link.

The terms "code," "program," "program code," and/or "programming code," as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, VERILOG, JAVA, and/or other types of hardware or software based code that may be compiled and/or synthesized); binary code that may be executed (e.g., executable files that may directly be executed by an operating system, bitstream files that can be used to configure a field-programmable gate array (FPGA), JAVA byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations.

Example Environment Arrangement

Figure 2:
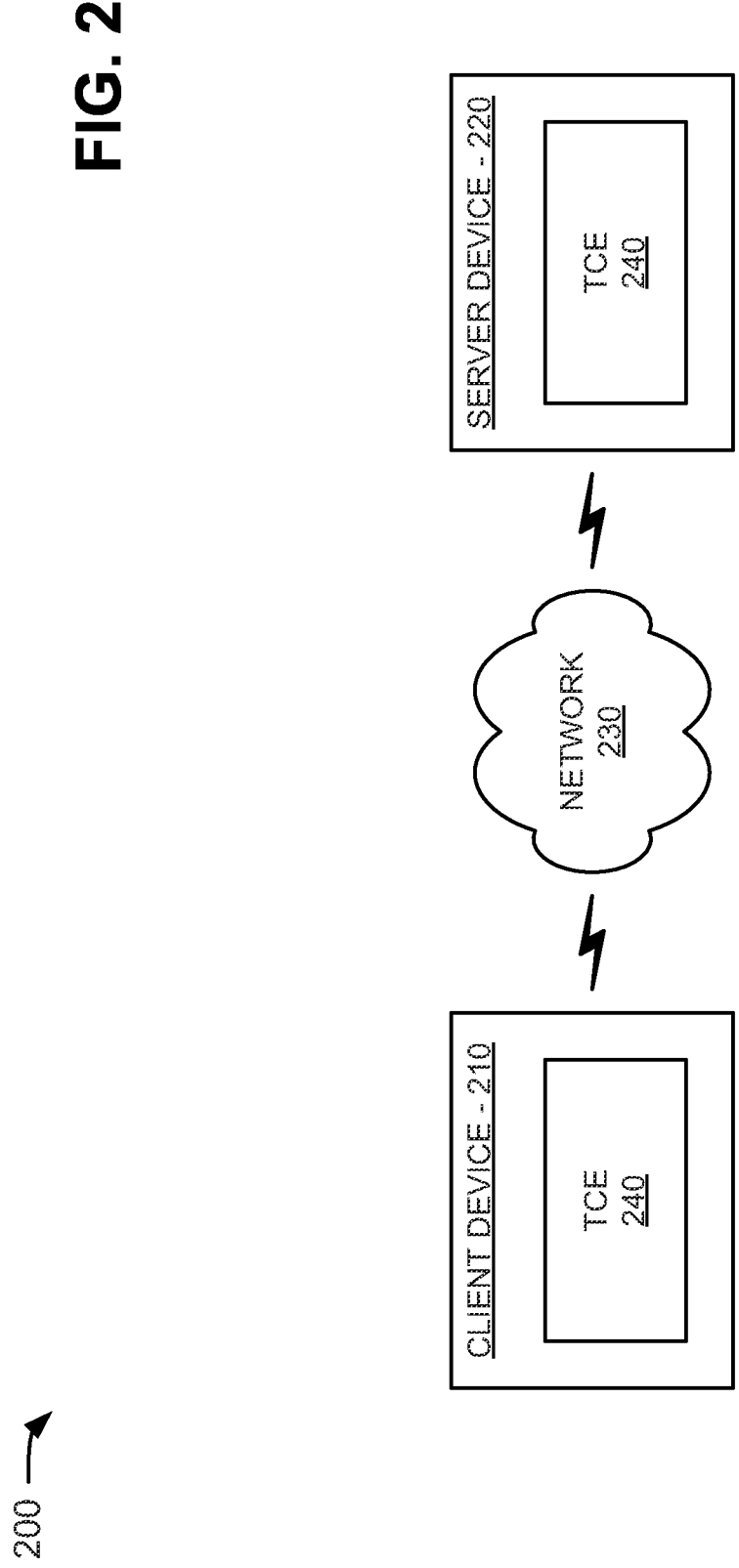
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
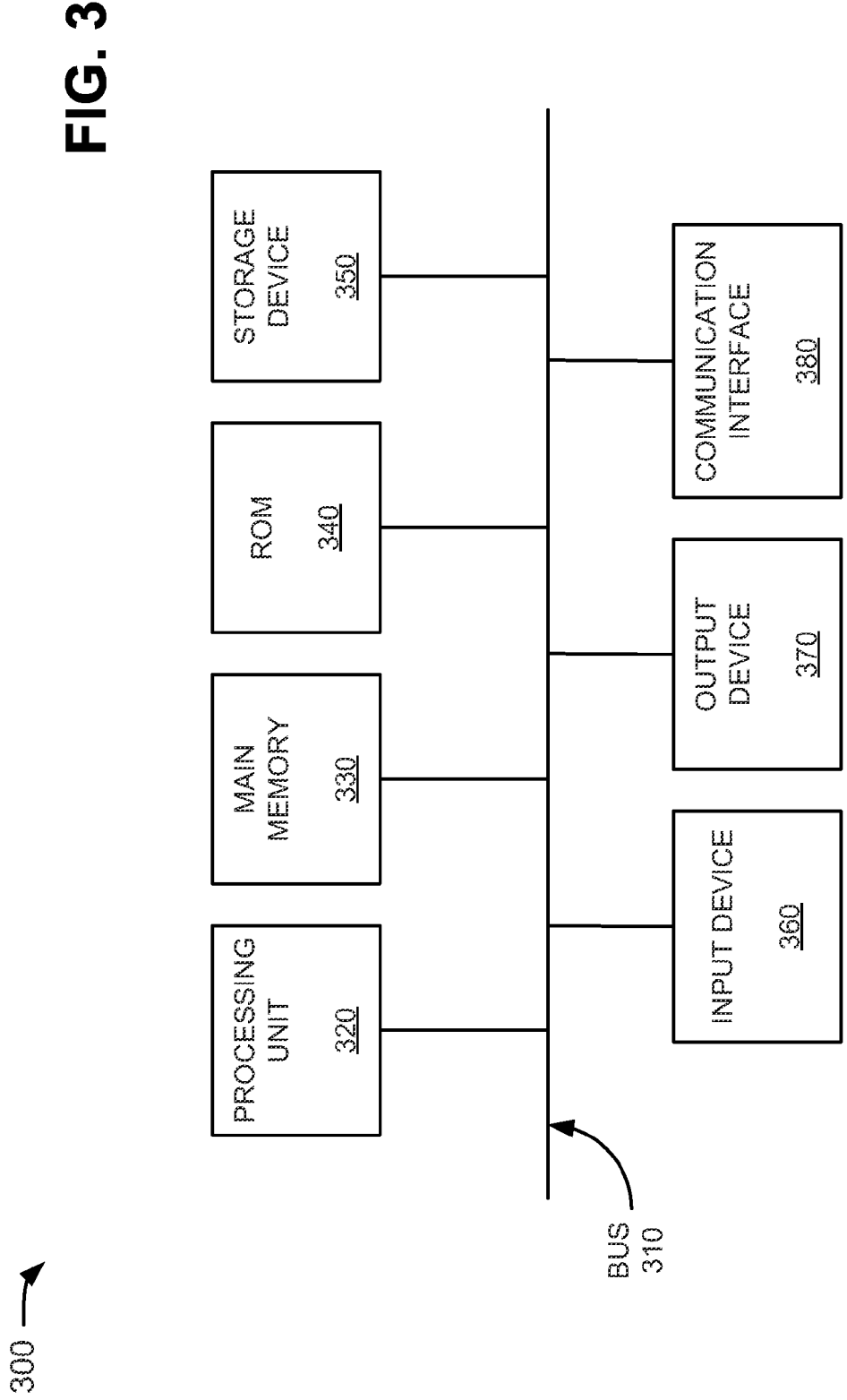
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
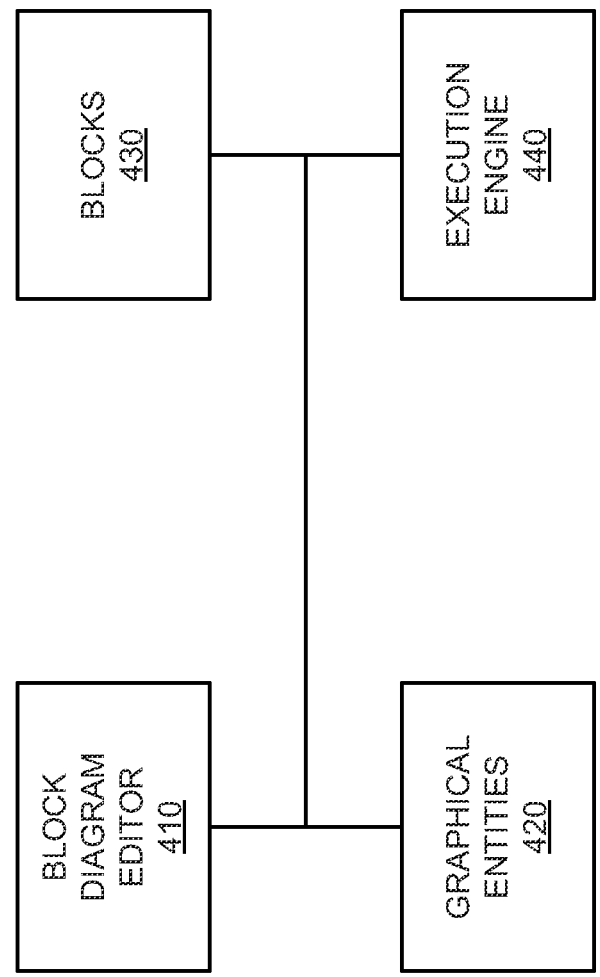
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities may include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Code Generation and Execution

Figure 5:
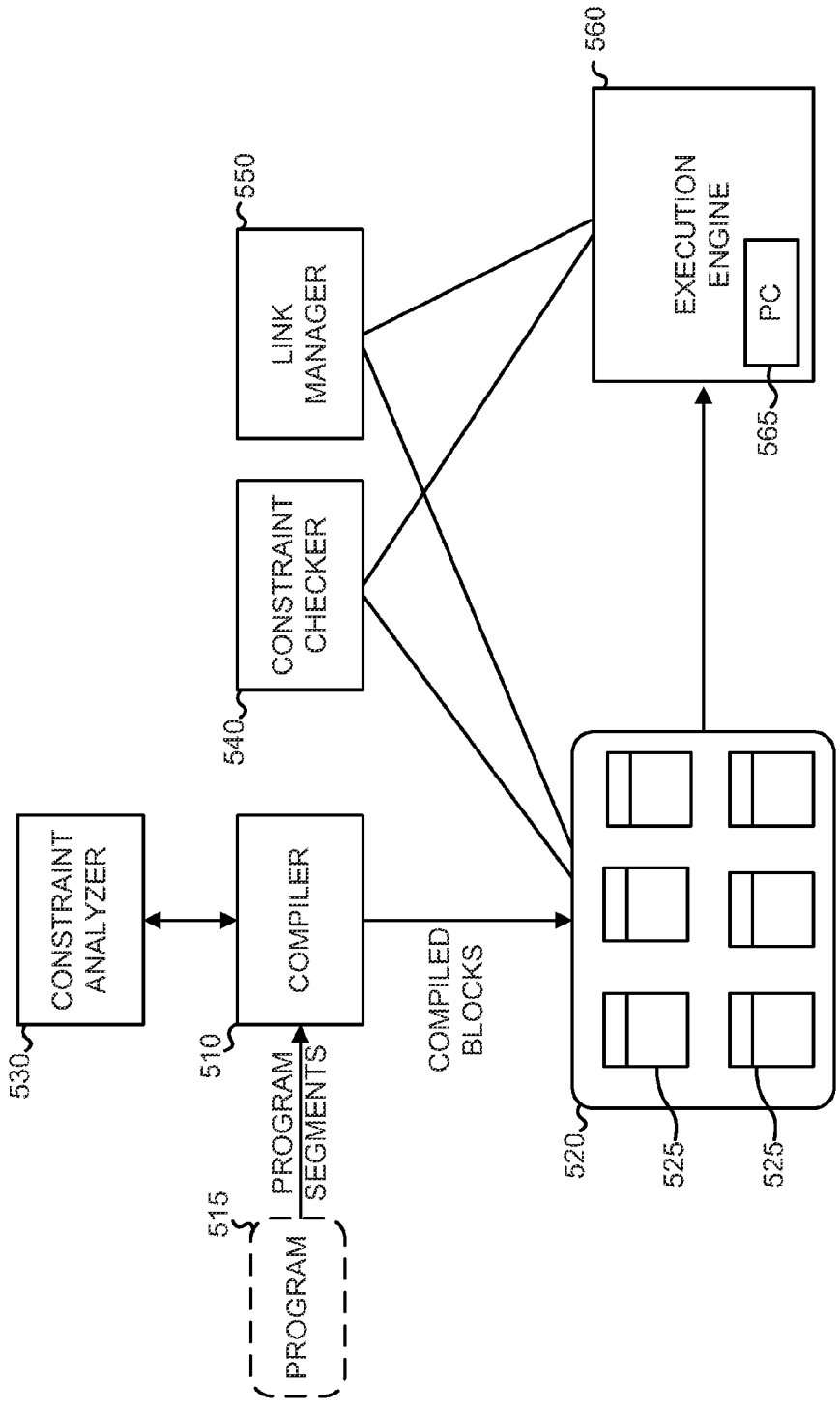
FIG. 5 is a diagram of further example functional components of the TCE.

FIG. 5 is a diagram of further example functional components of TCE 240 (FIGS. 2-4). In one implementation, the functions described in connection with FIG. 5 may be performed by one or more components of device 300 (FIG. 3) and/or by one or more devices 300. As shown in FIG. 5, TCE 240 may include a compiler 510, a cache 520, a constraint analyzer 530, a constraint checker 540, a link manager 550, and an execution engine 560.

Compiler 510 may transform an input program 515, written in a dynamic programming language (e.g., a source language), into a second programming language, which may be referred to as a target language. Compiler 510 may compile program 515 in a piecemeal fashion in which segments of program 515 (e.g., program segments) are compiled on-the-fly and as needed for program execution. The target language may include a binary form that is designed to execute on a particular processor or hardware platform. In one example implementation, compiler 510 may first convert program 515 into an intermediate representation (IR) that may then be converted into the target language. Although the operations of FIG. 5 are described, for clarity, as being applied to program 515 written in a dynamic programming language, the operations of FIG. 5 may also be applied to intermediate representation of program 515. In this situation, program 515 may be converted into the intermediate representation by compiler 510 or by another component, such as a pre-compiler (not shown). The pre-compiler may then input the intermediate representation, as program segments, to compiler 510.

Each program segment, after compiling by compiler 510, may be referred to as a block or a compiled block herein. A block may include one entry and one or more exits. Blocks may be selected so that types of variables and/or temporary values within the block are deterministically known or can be inferred. For example, an abstract interpretation technique may be used to determine the types of variables and/or temporary values within the blocks. In one example implementation, occurrences of loops or other programmatic control flows may terminate a block. In such an example, each block may represent a linear sequence of program instructions for which abstract interpretation can be performed. Statements that cannot be abstractly interpreted may terminate a block. Compiler 510 may provide the compiled blocks to cache 520.

Cache 520 may receive and store the compiled blocks, as indicated by reference number 525. Cache 520 may include, for example, a data structure stored in a memory, such as volatile or non-volatile computer memory. Blocks 525, stored in cache 520, may be associated with a program counter value at which a block 525 occurs, and may also be associated with constraints that define conditions that should be satisfied before a block 525 can be executed. Linking information that defines links between blocks 525 may also be associated with blocks 525. In one example implementation, the constraints and the linking information may be stored as part of each block 525, and the program counter may be used as an index by which blocks 525 are stored in cache 520. Thus, for any particular program counter value, a corresponding set of blocks 525, in cache 520, may be obtained.

As compiler 510 compiles blocks 525, a quantity of blocks 525 in cache 520 may increase. If execution of program 515 results in a previously executed block 525 being executed a second (or additional) time, the previously executed block 525 may be obtained from cache 520 without having to be re-compiled by compiler 510. In one example implementation, blocks 525 in cache 520 that are no longer valid, such as blocks 525 for which the associated type-based constraints are rendered incomplete or are otherwise no longer valid, based on a current state of the computing environment, may be removed from cache 520. For example, when a user (e.g., a programmer) indicates that a new or different program 515 is to be executed, cache 520 may be cleared. Alternatively, or additionally, cache 520 may continue to store blocks 525, corresponding to program 515, for efficient future execution of program 515.

Constraint analyzer 530 may determine run-time information (e.g., read and write lists) for blocks 525 in cache 520. For example, constraint analyzer 530 may determine the read and write lists for a block 525, based on interaction with compiler 510 and while compiler 510 is compiling block 525. As used herein, a read list, for a block 525, may refer to variables that are read by block 525, and corresponding types of the variables that are read. Similarly, as used herein, a write list, for a block 525, may refer to variables that are written by block 525, and corresponding types of the variables that are written.

In one example implementation, constraint analyzer 530 may determine the read and write lists for a block 525 based on abstract interpretation of types. Abstract interpretation may refer to an approximation of semantics of program code without executing, or without fully executing, the program code. Constraint analyzer 530 may perform abstract interpretation based on a predefined association of functions, input types to the functions, and a corresponding result output type. For example, consider the program code:

z=y+3.

If "y" and "3" are known to be of "double" types, constraint analyzer 530 may identify a predefined signature corresponding to addition, such as:

+: <double, double>→double, which may indicate that, for addition, when both operands are of type "double," the result is also of type "double." As another example, a predefined signature for multiplication may be:

*: <double, double>→double, which may indicate that, for multiplication, when both operands are of type "double," the result is also of type "double." The abstract interpretation, performed by constraint analyzer 530, may be relatively fast compared to abstract interpretation applied to a complete program. In particular, because blocks 525 analyzed by constraint analyzer 530 may be limited to linear blocks that do not contain control flows, the abstract interpretation may be a fast abstract interpretation.

In one example implementation, program 515 may include pointer variables. The pointer variables may be aliased so that multiple different pointer variables can point to a single location. For example, if two pointer variables, "x" and "y", are aliased to one another, changing a type of one of the variables may correspondingly change a type of the other variable. For example, consider the pointer variables:

*x←−3.0;
*y←int32(3.0).

If the "x" and "y" pointer variables are aliased, the second assignment to "y" may change the type of "x" to "int32." When handling pointer types, constraint analyzer 530 may account for pointer aliasing by including a unique identifier as part of the pointer's type. In one example implementation, the location pointed to, by the pointer, may be used as the unique identifier. For example, for the statement "*x←−3.0," the type interpretation for "x" may be "pointer_to_double_at_location_L1." Similarly, for the statement "*y←int(32)," the type interpretation for "y" may be "pointer_to_int32_at_location_L2." Alternatively, or additionally, a location in the program code may be used to derive the unique identifier. In this manner, pointer aliasing may be accounted for in the type representation for pointer variables. This manner of resolution of pointer aliases may be more efficient than typical schemes used for resolution of pointer aliases.

The read list for a block 525 may correspond to initial constraints for block 525. In one example implementation, the read list and the initial constraints, for block 525, may be based only on variables that are within a lexical scope at the start of block 525. Lexical scope may refer to a context, within program code, in which a variable name is valid and can be used. Block boundaries may be selected so that lexical scope changes are only allowed at block boundaries.

Constraint checker 540 may verify run-time types of variables. Constraint checker 540 may, for example, communicate with execution engine 560 and/or be implemented as part of execution engine 560, to determine actual types in an execution environment of variables in program code being executed by execution engine 560. Constraint checker 540 may additionally determine whether the actual types of variables in the executing program code match constraints associated with blocks 525. Block 525 may be executed by execution engine 560 when variables in a read list of block 525 include the same types in a current program state as the variables had in a program state when block 525 was compiled by compiler 510.

Link manager 550 may manage links between blocks 525. In one example implementation, link manager 550 may analyze blocks 525 to determine links between blocks 525. The links may be used to define relationships between blocks 525, such as whether a particular block 525 is guaranteed or likely to follow another block 525. The links between blocks 525 may be used to reduce an amount of constraint checking that may otherwise be required to determine a next block 525 to execute. The use of links may optimize the selection of blocks 525 and may therefore improve execution efficiency of program 515.

Execution engine 560 may execute program 515 by executing blocks 525. Execution engine 560 may, for example, read blocks 525, from cache 520, in an order corresponding to a program flow of program 515. Execution engine 560 may maintain a program counter (PC) 565, which may include a value that defines a current execution point in program 515. As will be described in more detail below, program counter 565 may be used in determining which block 525 is next in the execution of program 515.

Although FIG. 5 shows example functional components of TCE 240, in other implementations, TCE 240 may include fewer functional components, different functional components, differently arranged functional components, and/or additional functional components than depicted in FIG. 5. Alternatively, or additionally, one or more functional components of TCE 240 may perform one or more other tasks described as being performed by one or more other functional components of TCE 240.

Figure 6:
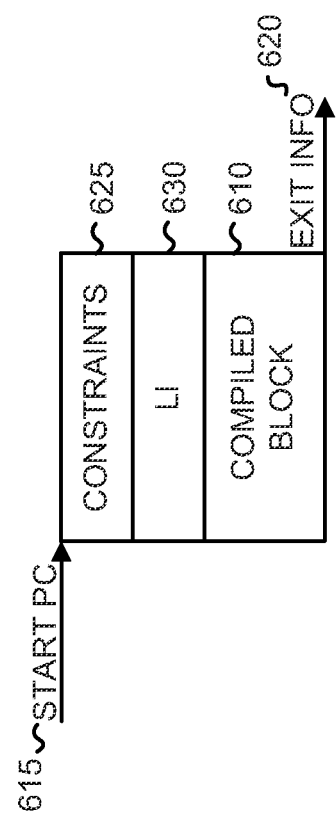
FIG. 6 is a diagram of an example block compiled by the functional components of the TCE.

FIG. 6 is a diagram of an example block 525 compiled by the functional components (e.g., compiler 510) of TCE 240. In one example, block 525 may include the features described above in connection with, for example, FIG. 5. As shown in FIG. 6, block 525 may include compiled block code 610 and additional data relating to block 525, such as a start program counter (PC) value 615, exit information (EXIT INFO) 620, constraints 625, and linking information (LI) 630. Since block 525 may include multiple exits, exit information 620 may describe the multiple exits. The additional data may be stored with block 525, in cache 520, or elsewhere (e.g., linking information 630 may be generated and stored by link manager 550).

Compiled block code 610 may include a compiled version of the program segment corresponding to block 525, after compiling by compiler 510. Start PC value 615 may indicate a starting location of block 525 within program 515. Constraints 625 may include constraints for block 525, such as, for example, type constraints relating to variables or temporary values that are read by block 525. When block 525 is not linked, constraints 625 may correspond to a read list for block 525, as may be determined by constraint analyzer 530.

Exit information 620 may include information about one or more exits of block 525. The information for an exit may include the starting PC for the next program segment if the next segment is known. The information for an exit may also include a description of the types of variables or temporary values that are guaranteed to be written by block 525.

Linking information 630 may include links, if any, corresponding to block 525. The links for block 525 may be generated and/or determined by link manager 550. In one example implementation, the links for block 525 may be stored as one or more outbound links from block 525 to other blocks. In this situation, the other blocks may be blocks that are known to follow or that are good candidates to follow block 525. A link may indicate that a linked-to block's constraints are guaranteed to be satisfied following block 525. In one example implementation, the links may include direct links or indirect links. A direct link may be created when the starting PC of the next block is known and available in exit information 620, and an indirect link may be used when the starting PC of the next block is not available in exit information 620. The processing of direct and indirect links is described in more detail below.

Although FIG. 6 shows example information that may be included in block 525, in other implementations, block 525 may include less information, different information, differently arranged information, and/or additional information than depicted in FIG. 6.

Figure 7:
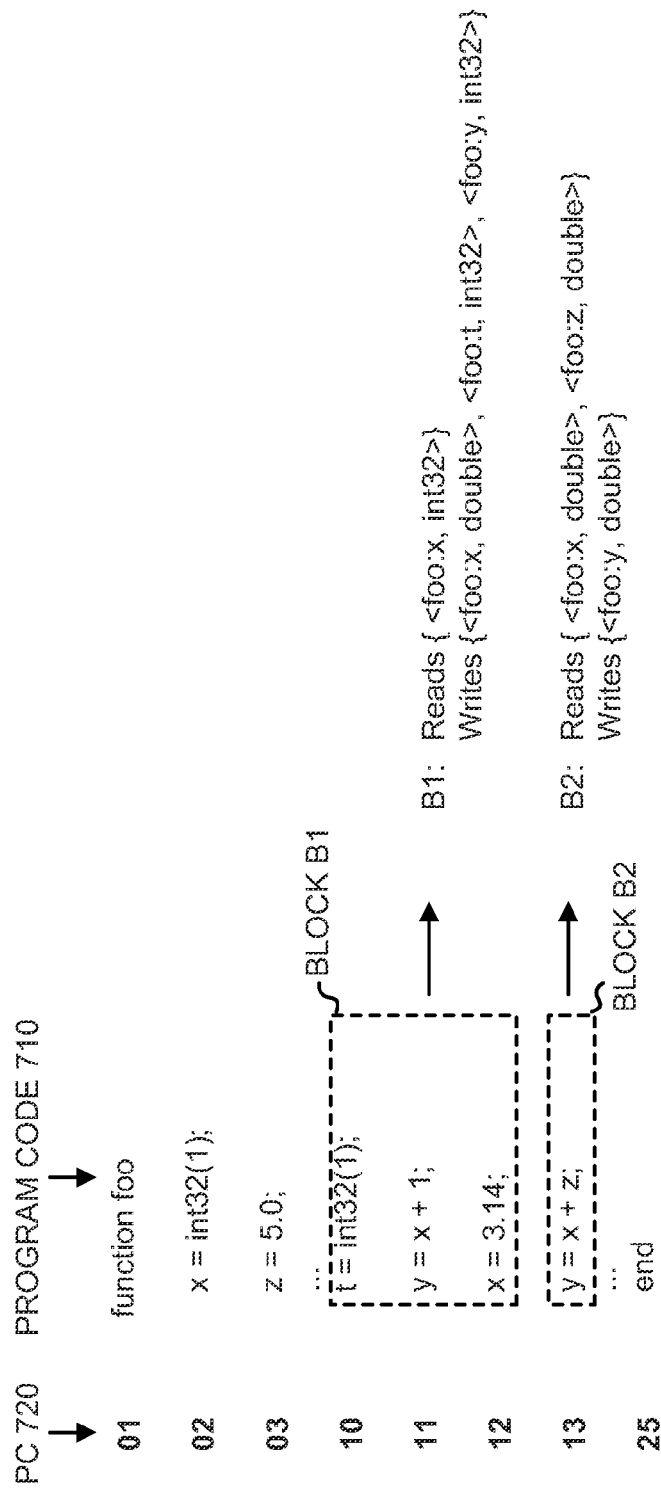
FIG. 7 is a diagram of example blocks that may be obtained from a program by the TCE.

FIG. 7 is a diagram of example blocks 700 that may be obtained from program 515 by TCE 240. In one example, program 515 may include the features described above in connection with, for example, FIG. 5. As shown in FIG. 7, program code 710 of program 515 may include a number of lines of code. In this example, program code 710 may implement a function "foo" and each line of program code 710 may be associated with a value of a program counter (PC) 720. Two segments of program code 710 are illustrated as being associated with blocks: a block B1, associated with lines 10, 11, and 12 of program code 710; and a block B2, associated with line 13 of program code 710.

Block B1 may include three lines of program code 710. A first line of block B1 (PC value 10) may write one variable "t," which is of type "int32." A second line of block B1 (PC value 11) may read one variable "x," which is of type "int32," and may write a variable "y," which is also of type "int32." A third line of block B1 (PC value 12) may write one variable "x," which is of type "double." As illustrated in FIG. 7, a complete read list for block B1 may be "<foo:x int32>," which may indicate that the variable "x," in function "foo," is of type "int32." A write list for block B1 may be "<foo:x, double>, <foo:t, int32>, <foo:y, int32>." Start PC 615 for block B1 may have a value of "10." Block B1 may have one exit, exit information 620 that contains a next PC with a value of "13," and the write list "<foo:x, double>, <foo:t, int32>, <foo:y, int32>."

Block B2 may include one line of code (PC value 13), which reads two variables and writes one variable. A read list for block B2 may be "<foo:x, double>, <foo:z, double>" and a write list for block B2 may be "<foo:y, double>." Start PC 615 for block B2 may have a value of "13." Block B2 may have one exit, exit information 620 that contains a next PC with a value of "14," and the write list "<foo:y, double>."

As described above in connection with FIG. 6, constraints 625 for a block 525 may be based on the read list for block 525. In the example of FIG. 7, constraints 625 for block B1 may be "<foo:x, int32>," and constraints 525 for block B2 may be "<foo:x, double>, <foo:z, double>." In one example implementation, constraints 625 for a block 525 may be modified, such as by link manager 550, as block 525 is linked to other blocks.

Although FIG. 7 shows example information that may be included in blocks 700, in other implementations, blocks 700 may include less information, different information, differently arranged information, and/or additional information than depicted in FIG. 7.

Example Process

Figure 8:
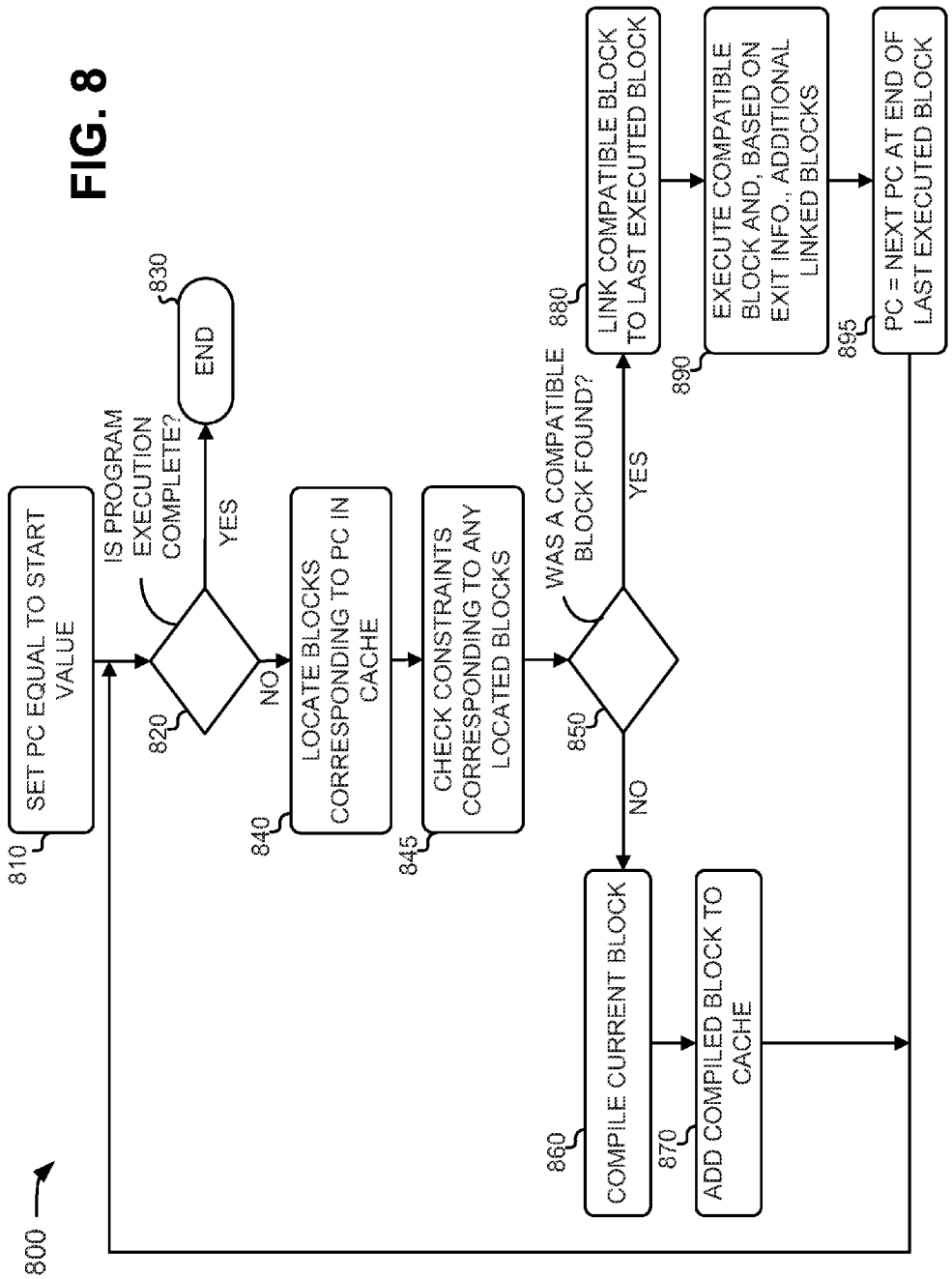
FIG. 8 is a flow chart of an example process for performing code generation and execution for a dynamic programming language.

FIG. 8 is a flow chart of an example process 800 for performing code generation and execution for a dynamic programming language. In one implementation, process 800 may be performed by client device 210/TCE 240. Alternatively, or additionally, process 800 may be performed by another device or a group of devices separate from or including client device 210/TCE 240.

As shown in FIG. 8, process 800 may include setting a program counter (PC) equal to a start value (block 810), and determining whether execution of a program is complete (block 820). For example, with reference to FIG. 5, execution engine 560 may set PC 565 to a program counter value corresponding to a first statement that is executed in program 515. Execution engine 560 may determine that program 515 is complete when, for example, PC 565 is assigned a value that corresponds to a termination point in program 515, such as an "end" statement within a main loop of program 515.

As further shown in FIG. 8, when execution of the program is determined to be complete (block 820—YES), process 800 may end (block 830). When execution of the program is not complete (block 820—NO), process 800 may include locating blocks corresponding to a program counter (PC) in a cache (block 840). For example, with reference to FIGS. 5 and 6, execution engine 560 may stop executing program 515 when the execution of program 515 is determined to be complete. In one example, a value of PC 565 may be used to lookup zero or more blocks 525, from cache 520, in which a starting PC value of blocks 525 match the value of PC 565. In some situations, no blocks 525 may match the value of PC 565. For instance, a first time a particular block 525 is reached, during execution of program 515, the particular block 525 may not be in cache 520. In some situations, multiple blocks 525, each having different sets of constraints 625, may be located in cache 520.

Returning to FIG. 8, process 800 may include checking whether constraints corresponding to the located blocks (if any) are compatible with values corresponding to a current computing environment of the program (block 845). For example, with reference to FIG. 5, constraint checker 540 may determine actual types of variables and/or temporary values in the program being executed, by execution engine 560, and may compare type-based constraints in blocks 525 to the actual types in the computing environment. If all the type-based constraints for a particular block 525 are satisfied by the actual types in the computing environment, the particular block 525 may be deemed to be a compatible block. In one example, consider a block 525 with a single constraint that includes a condition that a variable "x" is of type "double." If the variable "x," in the current computing environment, is of type "double," block 525 may be considered a compatible block. If the variable "x" is of any other type, block 525 may not be considered to be a compatible block.

As further shown in FIG. 8, process 800 may include determining whether a compatible block is found (block 850). When a compatible block is not found (block 850—NO), such as when no blocks are located (e.g., in block 840) or when blocks are located but none of the located blocks are compatible with the current computing environment (e.g., as determined in block 845), process 800 may include compiling a block corresponding to the current program counter (block 860), adding the compiled block to the cache (block 870), and returning to block 820. For example, with reference to FIG. 5, compiler 510 may receive a program segment, from program 515, corresponding to a next block in program 515. Compiler 510 may compile the next block. After compiling the next block, compiler 510 may store the next block in cache 520. Alternatively, or additionally, compiler 510 may transmit the block directly to execution engine 560.

Returning to FIG. 8, when a compatible block is found (block 850—YES), such as when at least one block is located (e.g., in block 840) and the type-based constraints are compatible with the current computing environment (e.g., as determined in block 845), process 800 may include linking the compatible block the last executed block (block 880). For example, with reference to FIG. 5, link manager 550 may determine direct links and/or indirect links between blocks 525. A link between a first block and a second block may indicate that, when constraints of the first block are satisfied, the constraints of the second block may also be satisfied. Additional details relating to the determination and use of direct and indirect links is described in more detail below.

As further shown in FIG. 8, process 800 may include executing the compatible block and, based on exit information, additional linked blocks (block 890), setting the program counter value equal to the next program counter value at the end of the last executed block (block 895), and returning to block 820. For example, with reference to FIG. 5, based on links associated with the compatible block, one or more additional linked blocks may be subsequently executed (e.g., by execution engine 560) without having to perform additional constraint checking Alternatively, or additionally, the one or more additional linked blocks may be subsequently executed with a less complex constraint checking procedure relative to a block that is not associated with a link. After execution of a block 525, execution engine 560 may set PC 565 to a next PC value. In one example, the next PC value may be a next PC value relative to a last executed block 525.

Example Direct Links and Indirect Links Between Blocks

Figure 9:
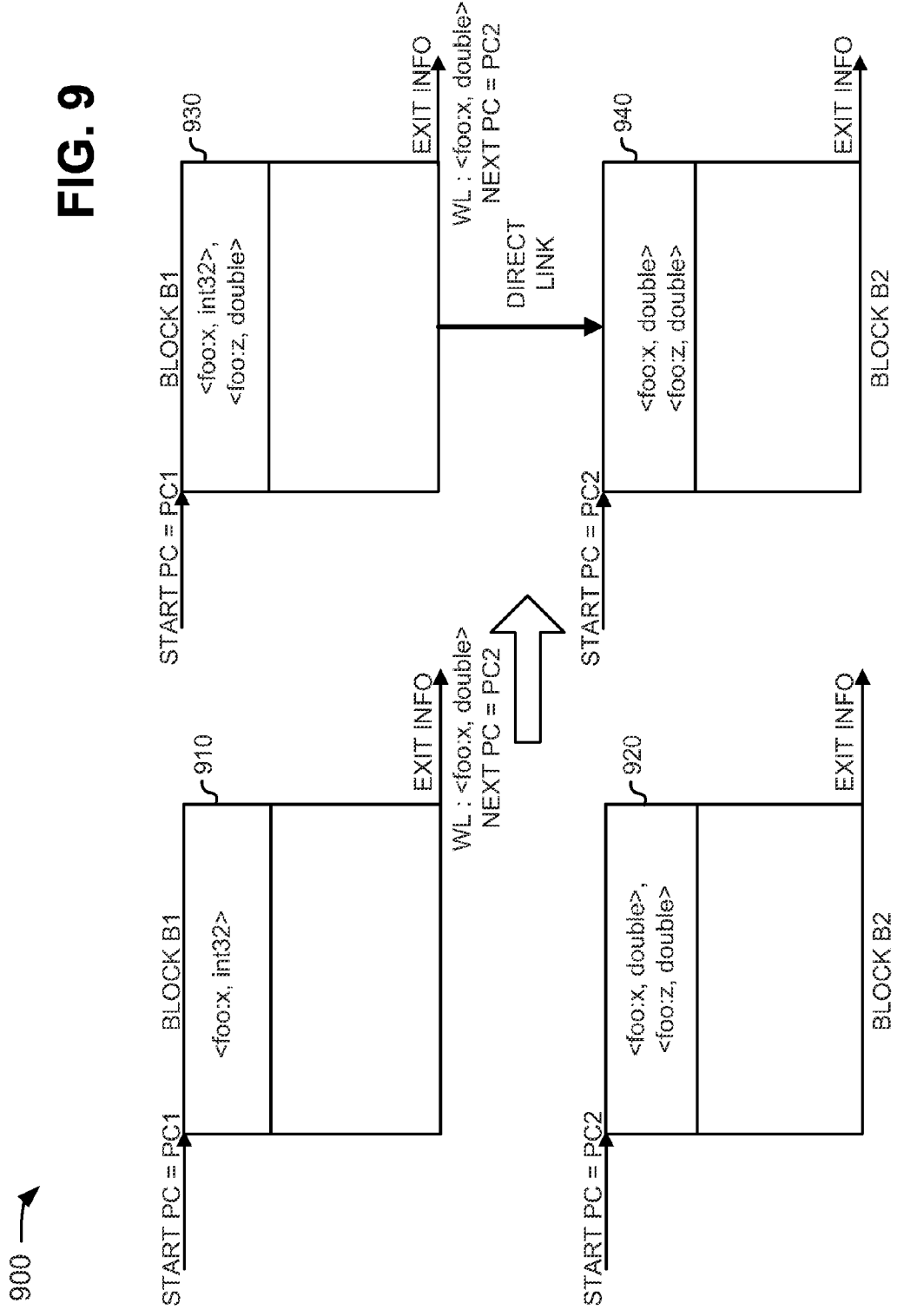
FIG. 9 is a diagram illustrating an example of a direct link between example blocks.

FIG. 9 is a diagram illustrating an example 900 of a direct link between example blocks. As described above, blocks 525 may be associated with linking information, such as information that defines direct links and/or indirect links between blocks 525. The linking information may be used to optimize execution of consecutive blocks 525. In one example, the blocks shown in FIG. 9 may correspond to and include the features of blocks B1 and B2 in FIG. 7.

As further shown in FIG. 9, block B1 may be initially associated with a read list "<foo:x, int32>." The read list for block B1 may correspond to initial constraints 910 for block B1. Block B2 may be initially associated with a read list "<foo:x, double>, <foo:z, double>." The read list for block B2 may correspond to initial constraints 920 for block B2.

In general, a direct link between two blocks 525 may be created by link manager 550 when a next program counter value after a block 525 is known at compile time. In this case, a direct link can be created between a first block 525 and a next block 525 that has a starting program counter value equal to the next program counter value after the first block 525. For blocks B1 and B2, code corresponding to block B2 is in the same lexical scope as code corresponding to block B1, since both blocks B1 and B2 include the function "foo." Block B2 follows block B1, as the start PC of block B2 (PC2) is the same as the next PC in the exit information of block B1. Accordingly, link manager 550 may create a direct link between blocks B1 and B2, as shown in FIG. 9.

Because blocks B1 and B2 are directly linked and are within the same lexical scope as one another, link manager 550 may back-propagate constraints from block B2 to block B1. Back-propagating constraints may refer to adding a constraint, from a later block 525 in a series of directly linked blocks, to an earlier block 525. In one example implementation, constraints may be back-propagated, from a directly linked next block 525 to a previous block 525, whenever a constraint in the next block 525 is not in a write list of the previous block 525. In the example of FIG. 9, the constraint "<foo:z, double>" may be back-propagated from block B2 to block B1. The constraint "<foo:x, double>," however, which is included in the write list of block B1 (see FIG. 7), may not be back-propagated, as the type of variable "x" is guaranteed for block B2. As shown in FIG. 9, after back-propagation, constraints 930 for block B1 may be "<foo:x, int32>, <foo:z, double>," and constraints 940 for block B2 may remain "<foo:x, double>,<foo:z, double>."

Since the constraint of block B1 may change after back-propagation, any previously established incoming links to block B1 may become invalid. In one example implementation, such incoming links to block B1 may be disconnected by link manager 550. Alternatively, or additionally, a strengthened constraint of block B1 may be further back-propagated through incoming links to any block linked to block B1.

In some implementations, a second block 525 that follows a first block 525 may be directly linked even when the first and second blocks 525 are of a different lexical scope. In particular, when constraints of the second block 525 are satisfied by a write list of the first block 525, link manager 550 may create a direct link from the first block 525 to the second block 525. This situation may correspond to a call to a function where a target function is known at compile time.

In some situations, link manager 550 may create indirect links between blocks. An indirect link may be used in the situation in which a next program counter value cannot be determined at compile time. An example of an indirect link may be a situation that corresponds to a last block 525 in a called function. The last block 525 may be indirectly linked to the calling function after the return from the called function.

Although FIG. 9 shows example operations associated with direct links, in other implementations, direct links may be created using additional operations and/or different operations than depicted in FIG. 9.

Figure 10:
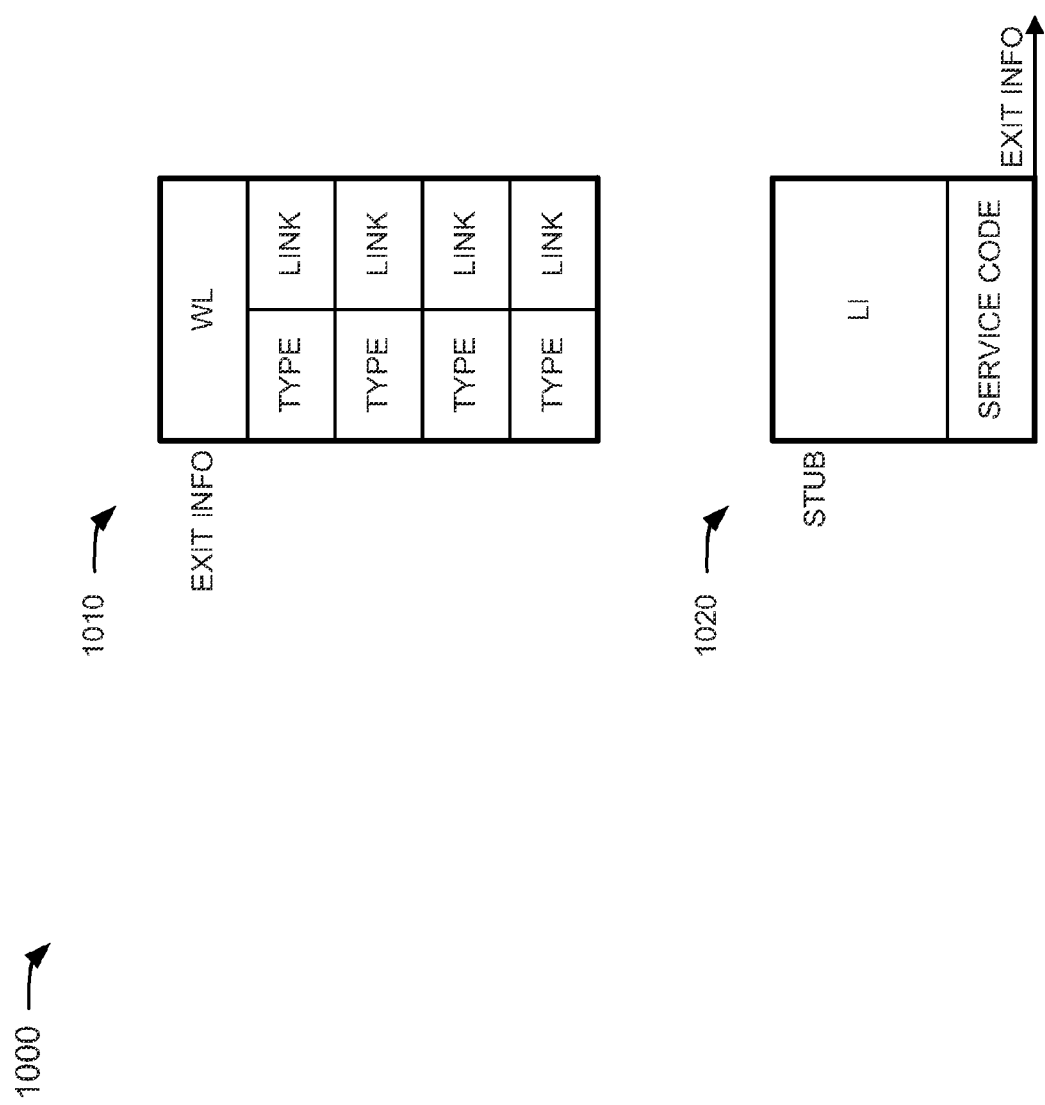
FIG. 10 is a diagram conceptually illustrating an example of checked links and indirect link stubs.

FIG. 10 is a diagram conceptually illustrating an example 1000 of checked links and indirect link stubs. During abstract interpretation on types, output types of many operations may be determined based on input types. For example, in an expression "y=x+1.5," a type of "y" may be determined to be a double when "x" and "1.5" are of type double. However, sometimes the types of inputs do not determine the type of the outputs. For example, in an expression "z=sqrt(x)," where "x" is of type double, a type of "z" can be either double or complex, depending on whether "x" is positive or not. Thus, the type of "z" may not be included in a write list, because the actual type of "z" may only be known at run time. Checked links (e.g., such as checked link 1010) may be used to handle such situations. Checked link 1010 may include a write list (WL) and a cache of type/link pairs. In checked link 1010, a quick lookup of the runtime type of a variable may be performed, and, based on that type, a link to the next block may be determined. Checked link 1010 may maintain a small cache of the possible types of the variable that are being checked, and corresponding links to next blocks.

When a next PC is not known at a block exit, an indirect link may be created from the exit to a next block. The next PC may be unknown in the last block of a function, when execution returns to a caller function or when calling a variable function. In these situations, indirect links may be created through a stub, such as indirect link stub 1020. Indirect link stub 1020 may be similar to a block, but may not include a start PC and constraints. Indirect link stub 1020 may include linking information (LI), exit information, and service code that performs additional tasks, such as checking for dirty bits. The code that exits the block may locate indirect link stub 1020 at a predetermined place (e.g., at a top of an execution stack), and may go to the next block following a link that is contained in indirect link stub 1020.

Program variables may exist in a certain scope. For example, a variable "x" in a function "foo" may exist in the scope of the function "foo" since "x" is written and read in that scope. Sometimes, values may be passed from one scope to another. For example, when calling a function, an input value may be written in the scope of a caller, and may be read (e.g., as a different variable) in a scope of a callee. Similarly, on return from a function, the callee may write a return value in the callee's scope, and the caller may read the return value as a different variable in the caller's scope. When creating a link from a first block in one scope to a second block in a different scope, a symbolic variable may be used to capture a type of a value being passed between the different scopes. A write list in exit information of the first block may include a pair of symbolic variables and a type at which the symbolic variable was written. A read list of the second block may include a pair of symbolic variables and a type at which the symbolic variable was read.

During execution of a program, there may be situations in which a current scope changes. For example, when executing a function "foo," active variables may be in the scope of "foo." When "foo" calls another function "bar," the scope of variables may change to the scope of "bar." When bar finishes execution and returns, the scope of variables may change back to the scope of "foo."

When the function "bar" is called, there may be no pre-existing values in the scope of "bar." A first block of "bar" may read the input values, and may read variables captured in the first block's constraint through a symbolic variable. However, after "bar" returns to "foo," pre-existing variables of "foo" may become visible again, and a block of "foo" following the return may read the pre-existing variables. This may make the types of the pre-existing variables a constraint on a compiled block. If a language supports closures, a call to a closure may result in entering a scope with pre-existing values.

When linking blocks that execute in different scopes, constraints of a second block may not be back-propagated to a first block since it would result in constraints that are out-of-scope. However, constraints from the second block may be back-propagated to a previous block that puts a stub in a pre-determined location. In the example above, that may be the block of "foo" that ends with the call to "bar." Alternatively, or additionally, a need for back-propagation may be eliminated by putting all in-scope variables in a constraint of a block that puts a stub in a pre-determined location. Alternatively, or additionally, serial numbers may be used to track a state of the execution environment.

If a language allows changing out-of-scope variables, back-propagating block constraints may not be sufficient to guarantee the types of pre-existing values. Dirty bits or flags, which may be checked during execution, may be used to capture any type change of an out-of-scope variable. Any language construct that changes the type of an out-of-scope value may set a dirty bit for the scope to which that value belongs. A link that enters a scope with pre-existing values may check whether the dirty bit is set. If the dirty bit is set, the link may not be followed but the state of values may be revalidated in the execution environment. At this time, link manager 550 may create a new link based on the current execution environment or may forego the creation of the new link.

Although FIG. 10 shows example operations associated with checked links and indirect link stubs, in other implementations, checked links and indirect link stubs may be created using additional operations and/or different operations than depicted in FIG. 10.

CONCLUSION

Systems and/or methods, described herein, may generate and execute code for dynamic programming languages. For example, the systems and/or methods may generate code for program code provided by the dynamic programming languages. The program code may be generated a block at a time. A block may correspond to a program segment that includes one entry, one or more exits, and types of values that are deterministic and inferable with trivial analysis. A block may be created for a set of types, and multiple clones may be generated for a block. The clones may differ only in the types of values that the clones handle. The systems and/or methods may efficiently select and link these clones for execution.

The foregoing description of implementations provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIG. 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving programming code, corresponding to a dynamic programming language, that is to be executed in a computing environment,
the receiving being performed by a device; and
executing the received programming code,
the executing the received programming code being performed by the device and further comprising:
maintaining a program counter,
a value of the program counter identifying an execution location within the received programming code, and
the maintaining being performed by the device;
selecting blocks of the received programming code based on the value of the program counter,
the blocks corresponding to segments of the received programming code,
the blocks being associated with one or more type-based constraints that relate to types of variables that are used by the blocks, and
the selecting being performed by the device;
compiling the selected blocks,
the compiling being performed by the device;
caching the compiled blocks along with the one or more type-based constraints,
the cached compiled blocks being reused, without recompiling the cached compiled blocks, when the one or more type-based constraints of the cached compiled blocks are satisfied, and
the caching being performed by the device;
generating linking information between certain ones of the compiled blocks based on the one or more type-based constraints,
the linking information relating to an indication that the certain ones of the compiled blocks will execute in an order indicated by the linking information, and
the generating being performed by the device; and
executing the compiled blocks in an order based on one or more of the program counter, the one or more type-based constraints, or the linking information,
the executing the compiled blocks being performed by the device.

2. The method of claim 1, where executing the compiled blocks further comprises:
executing one or more of the compiled blocks to obtain values relating to the executing of the one or more of the compiled blocks; and
using the obtained values to facilitate:
a selection of subsequent blocks corresponding to the received programming code, and
a compilation of the subsequent blocks.

3. The method of claim 1, where executing the compiled blocks further comprises:
selecting, as a next compiled block to execute after executing a particular compiled block, the next compiled block based on linking information or based on the program counter and the one or more type-based constraints,
the next compiled block being selected based on the linking information when the linking information is between the particular compiled block and the next compiled block, and
the next compiled block being selected based on the program counter and the one or more type-based constraints when the linking information is not between the particular compiled block and the next compiled block.

4. The method of claim 3, where each of the compiled blocks is associated with a respective program counter value, and
where selecting the next compiled block further comprises:
comparing the one or more type-based constraints in a subset of the compiled blocks, in which the respective program counter value matches a current value of the program counter; and
selecting the next compiled block as a compiled block, from the subset, in which the one or more type-based constraints associated with the compiled block matches variable types in a currently executed block.

5. The method of claim 1, where the linking information includes:
a direct link that links a first compiled block, of the compiled blocks, to a second compiled block, of the compiled blocks, when the first compiled block is determined to be a guaranteed predecessor of the second compiled block in the received programming code, and
an indirect link that links a third compiled block, of the compiled blocks, to a fourth compiled block, of the compiled blocks, when:
the fourth compiled block follows the third compiled block in one or more instances of the received programming code, and
the fourth compiled block is not guaranteed to always follow the third compiled block in the received programming code.

6. A device comprising:
one or more processors to:
receive programming code, corresponding to a dynamic programming language, that is to be executed by a computing environment, and
execute the received programming code,
when executing the received programming code, the one or more processors are to:
maintain a program counter,
a value of the program counter identifying an execution location within the received programming code,
select blocks of the received programming code based on the value of the program counter,
the blocks corresponding to segments of the received programming code, and
the blocks being associated with one or more type-based constraints that relate to types of variables that are used by the blocks,
compile the selected blocks,
cache the compiled blocks along with the one or more type-based constraints,
the cached compiled blocks being reused, without recompiling the cached compiled blocks, when the one or more type-based constraints of the cached compiled blocks are satisfied, generate linking information between certain ones of the compiled blocks based on the one or more type-based constraints, the linking information relating to an indication that the certain ones of the compiled blocks will execute in an order indicated by the linking information, and execute the compiled blocks in an order based on one or more of the program counter, the one or more type-based constraints, or the linking information.

7. The device of claim 6, where the one or more type-based constraints additionally relate to types of temporary program values that are used by the blocks.

8. The device of claim 6, where one or more of the compiled blocks correspond to a same segment of the received programming code.

9. The device of claim 6, where, when executing the compiled blocks, the one or more processors are further to:

execute one or more of the compiled blocks to obtain values relating to the executing of the one or more of the compiled blocks, and use the obtained values to facilitate:
a selection of subsequent blocks corresponding to the received programming code, and
a compilation of the subsequent blocks.

10. The device of claim 6, where, when executing the compiled blocks, the one or more processors are further to:

select, as a next compiled block to execute after executing a particular compiled block, the next compiled block based on:

linking information, or the program counter and the one or more type-based constraints, the next compiled block being selected based on the linking information when the linking information is between the particular compiled block and the next compiled block, the next compiled block being selected without regard to the one or more type-based constraints for the next compiled block, and the next compiled block being selected based on the program counter and the one or more type-based constraints when the linking information is not between the particular compiled block and the next compiled block.

11. The device of claim 10, where each of the compiled blocks is associated with a respective program counter value and, when selecting the next compiled block, the one or more processors are further to:

compare the one or more type-based constraints in a subset of the compiled blocks, in which the respective program counter value matches a current value of the program counter, and select the next compiled block as a compiled block, from the subset, in which the one or more type-based constraints associated with the compiled block matches variable types in a currently executed block.

12. The device of claim 6, where the one or more type-based constraints are determined based on a fast abstract interpretation of types applied to the selected blocks.

13. The device of claim 12, where the one or more processors are further to:

represent pointer type variables using a representation that includes an indication of a type and a location.

14. The device of claim 6, where, when generating the linking information, the one or more processors are further to:

back-propagate the one or more type-based constraints from later executed compiled blocks, in a particular series of compiled blocks associated with the linking information, to earlier executed compiled blocks, in the particular series of compiled blocks associated with the linking information.

15. The device of claim 14, where, when generating the linking information, the one or more processors are further to:

back-propagate the one or more type-based constraints, from the later executed compiled blocks to the earlier executed compiled blocks, by only back-propagating a constraint, of the one or more type-based constraints, that is not satisfied by the earlier executed compiled blocks.

16. The device of claim 15, where, when generating the linking information, the one or more processors are further to:

back-propagate the one or more type-based constraints to a source compiled block in the particular series of compiled blocks, and remove incoming links, from the linking information, that are incoming to the source compiled block.

17. The device of claim 6, where the linking information includes:

a direct link that links a first compiled block, of the compiled blocks, to a second compiled block, of the compiled blocks, when the first compiled block is determined to be a guaranteed predecessor of the second compiled block in the received programming code, and an indirect link that links a third compiled block, of the compiled blocks, to a fourth compiled block, of the compiled blocks, when:

the fourth compiled block follows the third compiled block in one or more instances of the received programming code, and the fourth compiled block is not guaranteed to always follow the third compiled block in the received programming code.

18. The device of claim 17, where, when executing the compiled blocks, the one or more processors are further to:

select, as a next compiled block to execute after executing a particular compiled block in which the particular compiled block includes an indirect link to the next compiled block, the next compiled block based on the indirect link.

19. The device of claim 6, where, when executing the received programming code, the one or more processors are further to:

invalidate an entry associated with the cached compiled blocks when the computing environment changes in a manner that renders the one or more type-based constraints incomplete.

20. One or more non-transitory computer-readable media storing instructions, the instructions comprising:

one or more instructions that, when executed by a processor of a device, cause the processor to:

receive programming code, corresponding to a dynamic programming language, that is to be executed in a computing environment, and execute the received programming code, the one or more instructions to execute the received programming code including:
one or more instructions to:
maintain a program counter,
a value of the program counter identifying an execution location within the received programming code,
select blocks of the received programming code based on the value of the program counter,
the blocks corresponding to segments of the received programming code, and
the blocks being associated with one or more type-based constraints that relate to types of variables that are used by the blocks, compile the selected blocks,
cache the compiled blocks along with the one or more type-based constraints,
the cached compiled blocks being reused, without recompiling the cached compiled blocks, when the one or more type-based constraints of the cached compiled blocks are satisfied,
generate linking information between certain ones of the compiled blocks based on the one or more type-based constraints,
the linking information relating to an indication that the certain ones of the compiled blocks will execute in an order indicated by the linking information, and
execute the compiled blocks in an order based on one or more of the program counter, the one or more type-based constraints, or the linking information.

21. The one or more non-transitory computer-readable media of claim 20, where the one or more instructions to execute the compiled blocks include:
one or more instructions that, when executed by the processor, cause the processor to:
execute one or more of the compiled blocks to obtain one or more values relating to the executing of the one or more of the compiled blocks, and
use the obtained one or more values to facilitate:
a selection of subsequent blocks corresponding to the received programming code, and
a compilation of the subsequent blocks.

\* \* \* \* \*